United States Patent
Lai

(10) Patent No.: US 9,080,725 B2
(45) Date of Patent: Jul. 14, 2015

(54) PRESSURE VESSEL

(71) Applicant: PA.E Machinery Industrial Co., Ltd., Taichung (TW)

(72) Inventor: Ming-Yu Lai, Taichung (TW)

(73) Assignee: PA.E Machinery Industrial Co., Ltd., Taichung (TW)

( * ) Notice: Subject to any disclaimer, the term of this patent is extended or adjusted under 35 U.S.C. 154(b) by 106 days.

(21) Appl. No.: 14/031,110

(22) Filed: Sep. 19, 2013

(65) Prior Publication Data

US 2015/0076159 A1  Mar. 19, 2015

(51) Int. Cl.
*F17C 1/00* (2006.01)

(52) U.S. Cl.
CPC .................. *F17C 1/00* (2013.01)

(58) Field of Classification Search
CPC .............. B65D 25/04; F17C 5/02; F17C 1/00
USPC ......................................................... 220/581
See application file for complete search history.

(56) References Cited

U.S. PATENT DOCUMENTS

| | | | | |
|---|---|---|---|---|
| 2,407,076 A * | 9/1946 | Harkness | ...................... | 174/367 |
| 2,500,119 A * | 3/1950 | Cooper | ......................... | 222/394 |
| 2,962,110 A * | 11/1960 | Depman | ....................... | 181/211 |
| 3,174,658 A * | 3/1965 | Wittenberg et al. | ....... | 222/386.5 |
| 4,175,424 A * | 11/1979 | Bimond et al. | ................ | 73/49.2 |
| 4,884,708 A * | 12/1989 | Lange et al. | .................. | 220/589 |
| 5,551,590 A * | 9/1996 | Mazur et al. | ............... | 220/23.83 |
| 5,839,600 A * | 11/1998 | Moreira et al. | .......... | 220/560.04 |
| 5,908,134 A * | 6/1999 | Hale et al. | ...................... | 220/582 |
| 6,041,820 A * | 3/2000 | Boehme | .......................... | 138/30 |
| 6,089,399 A * | 7/2000 | Felbaum et al. | .............. | 220/582 |
| 6,186,356 B1 * | 2/2001 | Berkley et al. | ................ | 220/582 |
| 6,517,117 B1 * | 2/2003 | Lai | ................ | 285/202 |
| 7,861,887 B2 * | 1/2011 | Ota et al. | ...................... | 220/581 |
| 8,348,085 B2 * | 1/2013 | Wang | ............................. | 220/584 |
| 8,403,170 B1 * | 3/2013 | Lai | ............................. | 220/581 |
| 8,523,001 B2 * | 9/2013 | Acker | ............................. | 220/584 |
| 8,668,108 B2 * | 3/2014 | Yeggy et al. | ................. | 220/589 |
| 8,796,600 B2 * | 8/2014 | Handa | ........................... | 219/628 |
| 8,881,932 B1 * | 11/2014 | Warner et al. | ................ | 220/581 |
| 2003/0155386 A1 * | 8/2003 | Lai | ............................. | 222/564 |
| 2004/0031800 A1 * | 2/2004 | Wang | ............................. | 220/581 |
| 2004/0056164 A1 * | 3/2004 | Eihusen et al. | .............. | 248/312 |
| 2004/0104235 A1 * | 6/2004 | Sakaguchi et al. | ........... | 220/581 |
| 2005/0006393 A1 * | 1/2005 | Carter | ........................... | 220/581 |
| 2005/0017016 A1 * | 1/2005 | Lombari | ....................... | 220/721 |
| 2005/0077204 A1 * | 4/2005 | Sumi et al. | ..................... | 206/710 |
| 2011/0056472 A1 * | 3/2011 | Stone | ............................... | 124/74 |
| 2011/0101002 A1 * | 5/2011 | Strack | ........................... | 220/586 |
| 2011/0233218 A1 * | 9/2011 | Uchimura | ..................... | 220/581 |

* cited by examiner

*Primary Examiner* — Anthony Stashick
*Assistant Examiner* — Jennifer N Zettl
(74) *Attorney, Agent, or Firm* — Trop, Pruner & Hu, P.C.

(57) ABSTRACT

A pressure vessel includes an inner liner, a tubing connector, and an anti-leakage unit. The inner liner is disposed in an outer shell and defines an inner space. The tubing connector is disposed outwardly of the inner space and is welded to the outer shell. The anti-leakage unit has inner and outer sealing rings, and a clamping member that extends into the tubing connector and the inner space and that has inner and outer end flanges. The inner and outer end flanges are disposed inside and outside the inner space, respectively. The inner and outer end flanges cooperatively provides a clamping force to press the inner and outer sealing rings against the inner liner and the tubing connector, respectively.

6 Claims, 4 Drawing Sheets

PRESSURE VESSEL

BACKGROUND OF THE INVENTION

1. Field of the Invention

The invention relates to a pressure vessel, more particularly to a pressure vessel including a clamping member that presses two sealing rings against a tubing connector and an inner liner, respectively.

2. Description of the Related Art

A pressure vessel can be used for storing drinking water and for providing a stable supply of the drinking water. The pressure vessel normally includes an outer shell of a metallic material, and an inner liner of a plastic material, such as polypropylene (PP), attached to an inner surface of the outer shell for preventing the drinking water from being contaminated by the metallic material.

U.S. Pat. No. 8,348,085 discloses a conventional pressure vessel that includes: an outer shell of a metallic material that defines an accommodating space therein; an inner liner of a plastic material that is attached to an inner surface of the outer shell; a flexible diaphragm disposed in the accommodating space; a through-wall connector that has an inner tubular portion and an exposed tubular portion which is welded to and extends outwardly from an exterior of the outer shell; and an anti-leakage assembly that is disposed between the inner liner and a neck section of the through-wall connector. The neck section of the through-wall connector is bent to hold the anti-leakage assembly against an interior of the inner liner. The inner tubular portion of the through-wall connector extends from the exposed tubular portion through the outer shell and the inner liner and into the accommodating space.

Since the inner liner is made from the plastic material, the through-wall connector is required to be welded to the outer shell before insertion of the inner liner into the outer shell so as to prevent softening and deformation of the inner liner due to the heat generated by the welding if the inner liner is inserted into the outer shell before the welding of the through-wall connector to the outer shell. As a consequence, insertion of the inner liner into the outer shell after the welding of the through-wall connector can be severely interfered by the inner tubular portion of the through-wall connector, which results in difficulty in assembling the inner liner with the outer shell and which can cause damage to the inner liner when the inner liner passes over the inner tubular portion of the through-wall connector.

SUMMARY OF THE INVENTION

Therefore, the object of the present invention is to provide a pressure vessel that can overcome the aforesaid drawback associated with the prior art.

According to the present invention, there is provided a pressure vessel that comprises an outer shell, an inner liner, a tubing connector, an anti-leakage unit, and a flexible diaphragm.

The outer shell defines an accommodating space therein, and has a top wall and a surrounding wall that extends downwardly from the top wall and that is formed with a side through-hole. The inner liner is disposed in the accommodating space, and has an inner surface that defines an inner space, a top wall that is attached to the top wall of the outer shell, and a surrounding wall that extends downwardly from the top wall of the inner liner, that is attached to the surrounding wall of the outer shell, and that is formed with a liner through-hole which is aligned with the side through-hole along an axis. The tubing connector is disposed outwardly of the inner space, is welded to an exterior of the outer shell, and defines a fluid channel that extends along the axis. The anti-leakage unit has a clamping member and elastic inner and outer sealing rings. The clamping member has a tube body and inner and outer end flanges. The tube body extends along the axis through the side through-hole and the liner through-hole and into the inner space and the fluid channel. The inner and outer end flanges extend outwardly and respectively from two opposite ends of the tube body. The inner end flange and the inner sealing ring are disposed in the inner space, and the outer end flange and the outer sealing ring are disposed outwardly of the inner space. The inner and outer end flanges cooperatively provide a clamping force to press the inner and outer sealing rings against the inner liner and the tubing connector, respectively. The flexible diaphragm is disposed in the accommodating space to partition the accommodating space into two separated spaces.

BRIEF DESCRIPTION OF THE DRAWINGS

In drawings which illustrate an embodiment of the invention.

DETAILED DESCRIPTION OF THE PREFERRED EMBODIMENT

Figure 1:
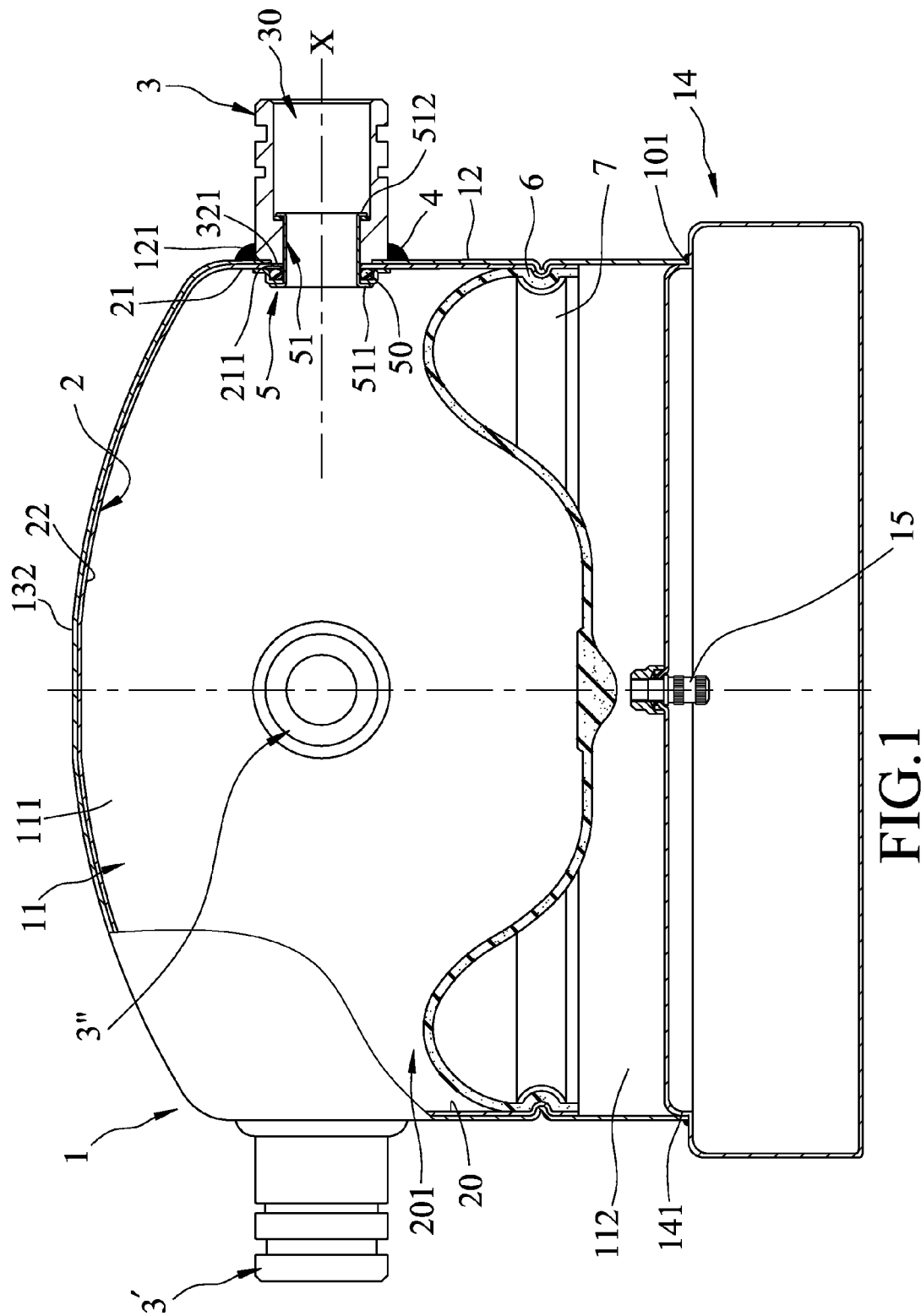
FIG. 1 is a partly sectional view of the preferred embodiment of a pressure vessel according to the present invention.
Figure 2:
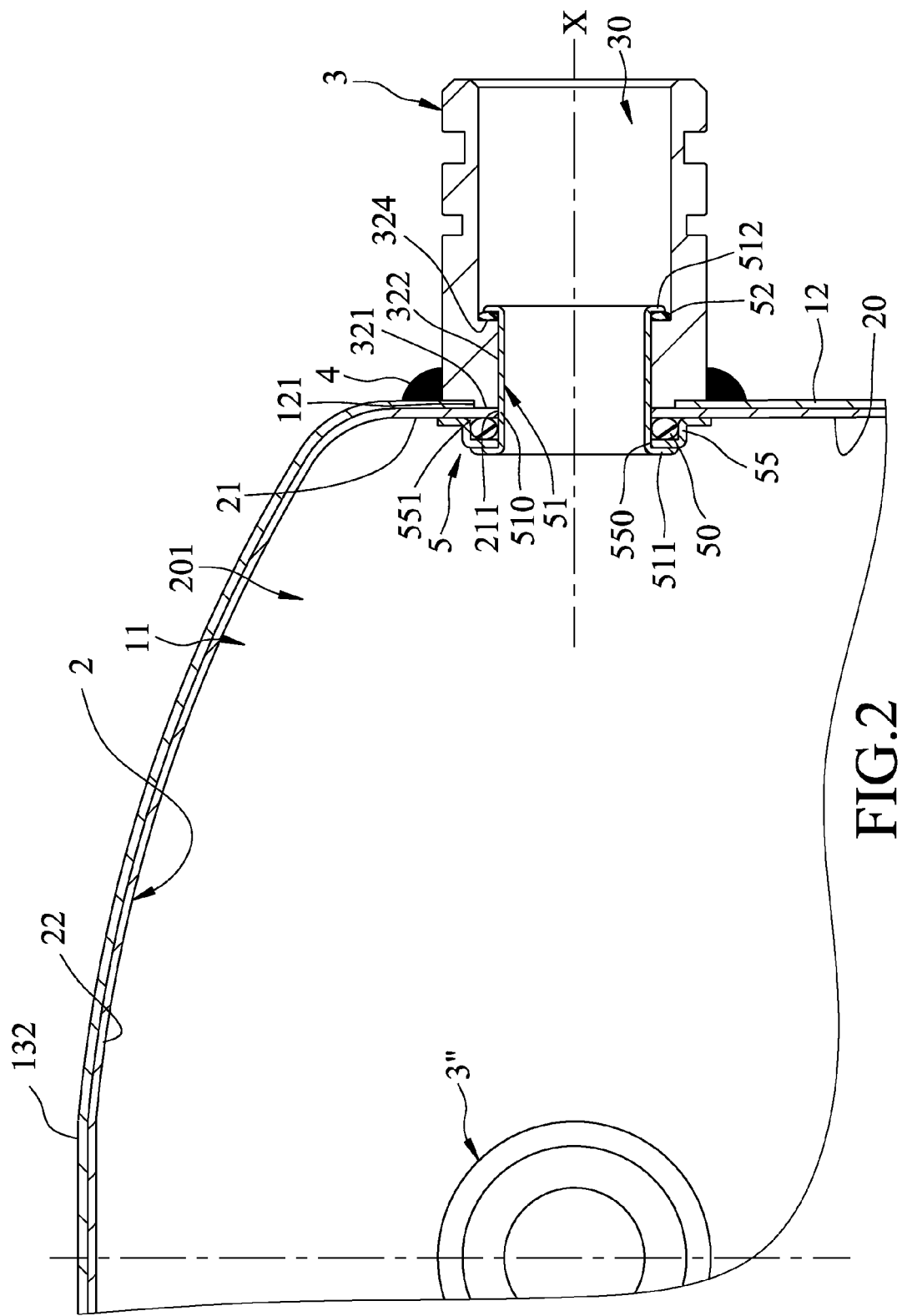
FIG. 2 is a fragmentary sectional view of the preferred embodiment.

FIGS. 1 and 2 illustrate the preferred embodiment of a pressure vessel for a water pumping system according to the present invention. The pressure vessel includes a base 14, a metallic outer shell 1, an inner liner 2 of a plastic material, a first tubing connector 3, a second tubing connector 3', a third tubing connector 3", an anti-leakage unit 5, and a flexible diaphragm 6.

The outer shell 1 defines an accommodating space 11 therein, and has a top wall 132 and a surrounding wall 12 that extends downwardly from the top wall 132 and that is formed with a side through-hole 121. The outer shell 1 further has a bottom opening 101 at a bottom end of the surrounding wall 12. The base 14 is in the form of a hollow stand with an upper end wall 141 that closes the bottom opening 101 of the outer shell 1 and that is welded to the bottom end of the surrounding wall 12 of the outer shell 1. Alternatively, the base 14 can include a stand and a half shell that extends from the stand and that has a structure which is an inverse of the structure of the outer shell 1.

The inner liner 2 is disposed in the accommodating space 11, and has an inner surface 20 that defines an inner space 201, a top wall 22 that is attached to the top wall 132 of the outer shell 1, and a surrounding wall 21 that extends downwardly from the top wall 22 of the inner liner 2, that is attached to the surrounding wall 12 of the outer shell 1, and that is formed with a liner through-hole 211 which is aligned with the side through-hole 121 along an axis (X).

Each of the first, second and third tubing connectors 3, 3', 3" is in the form of a quick release connector that is fixed to the outer shell 1 for connecting the pressure vessel to a pipeline (not shown). The first tubing connector 3 is disposed outwardly of the inner space 201, is welded to an exterior of the outer shell 1, and defines a fluid channel 30 that extends along the axis (X).

The anti-leakage unit 5 includes a clamping member 51, a retainer plate 55, and elastic inner and outer sealing rings 50, 52 that are in the form of an elastic O-ring. The clamping member 51 has a tube body 510 and inner and outer end flanges 511, 512. The tube body 510 extends along the axis (X) through the side through-hole 121 and the liner through-hole 211 and into the inner space 201 and the fluid channel 30. The inner and outer end flanges 511, 512 extend outwardly and respectively from two opposite ends of the tube body 510. The inner end flange 511 and the inner sealing ring 50 are disposed in the inner space 201. The outer end flange 512 and the outer sealing ring 52 are disposed outwardly of the inner space 201. The inner and outer end flanges 511, 512 cooperatively provide a clamping force to press the inner and outer sealing rings 50, 52 against the inner liner 2 and the first tubing connector 3, respectively, so as to provide a sealing effect between the clamping member 51 and the inner liner 2 and a sealing effect between the clamping member 51 and the first tubing connector 3.

The flexible diaphragm 6 is disposed in the accommodating space 11, and is fastened to the inner liner 2 through an annular fastening member 7, so as to partition the accommodating space 11 into an upper space 111 for storing water and a lower space 112 which is separated from the upper space 111 by the diaphragm 6 and which has a bottom side defining the bottom opening 101. The lower space 112 is closed from the bottom side by the upper end wall 141 of the base 14, and is adapted to receive pressurized air therein for applying a pressure to the diaphragm 6.

In this preferred embodiment, the first tubing connector 3 is further disposed outwardly of the accommodating space 11, and has an end face 321 that is disposed in the side through-hole 121 and that abuts against the periphery of the liner through-hole 211. The inner sealing ring 50 abuts against the periphery of the liner through-hole 211.

The first tubing connector 3 is formed with an inner shoulder 324 extending inwardly and radially into the fluid channel 30. The outer end flange 512 is disposed in the fluid channel 30. The outer sealing ring 52 is sandwiched between and abuts against the outer end flange 512 and the inner shoulder 324.

The fluid channel 30 has a diameter-reduced section 322 that extends between the inner shoulder 324 and the end face 321 of the first tubing connector 3 and that has an inner diameter. The liner through-hole 211 has an inner diameter that is substantially equal to the inner diameter of the diameter-reduced section 322 of the fluid channel 30.

The retainer plate 55 is formed with a central opening 550, abuts against the inner surface 20 of the inner liner 2, and cooperates with the periphery of the liner through-hole 211 to define an annular retaining gap 551 therebetween. The inner sealing ring 50 is retained in the retaining gap 551. The tube body 51 extends through the central opening 550. The inner end flange 511 abuts against the retainer plate 55.

A gas valve 15 is mounted to the upper end wall 141 of the base 14, extends into the lower space 112, and is adapted to be connected to an external air supplying source (not shown) for supplying the pressurized air into the lower space 112.

Figure 3:
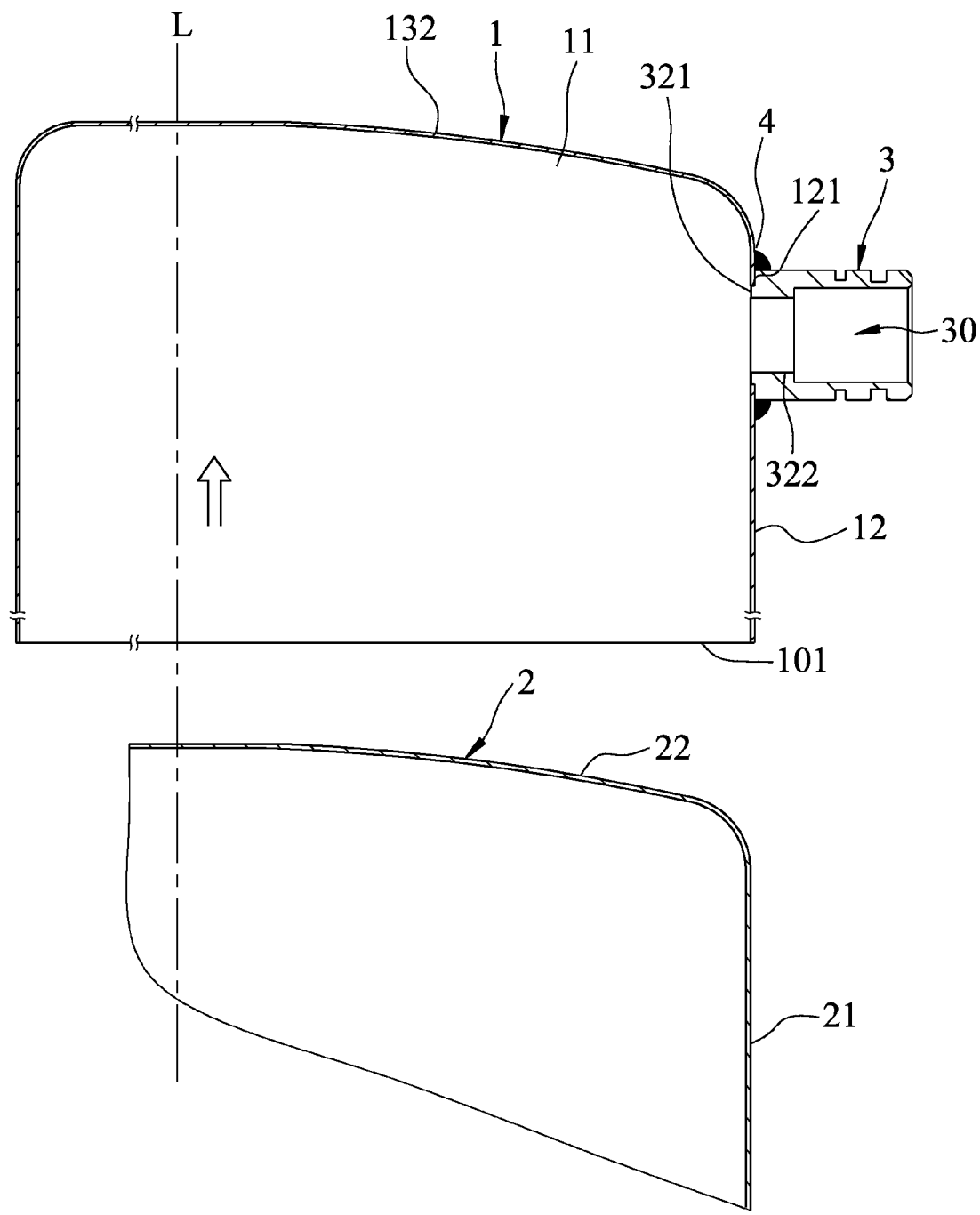
FIGS. 3 and 4 are fragmentary sectional views to illustrate consecutive steps of a method of assembling the pressure vessel.
Figure 4:
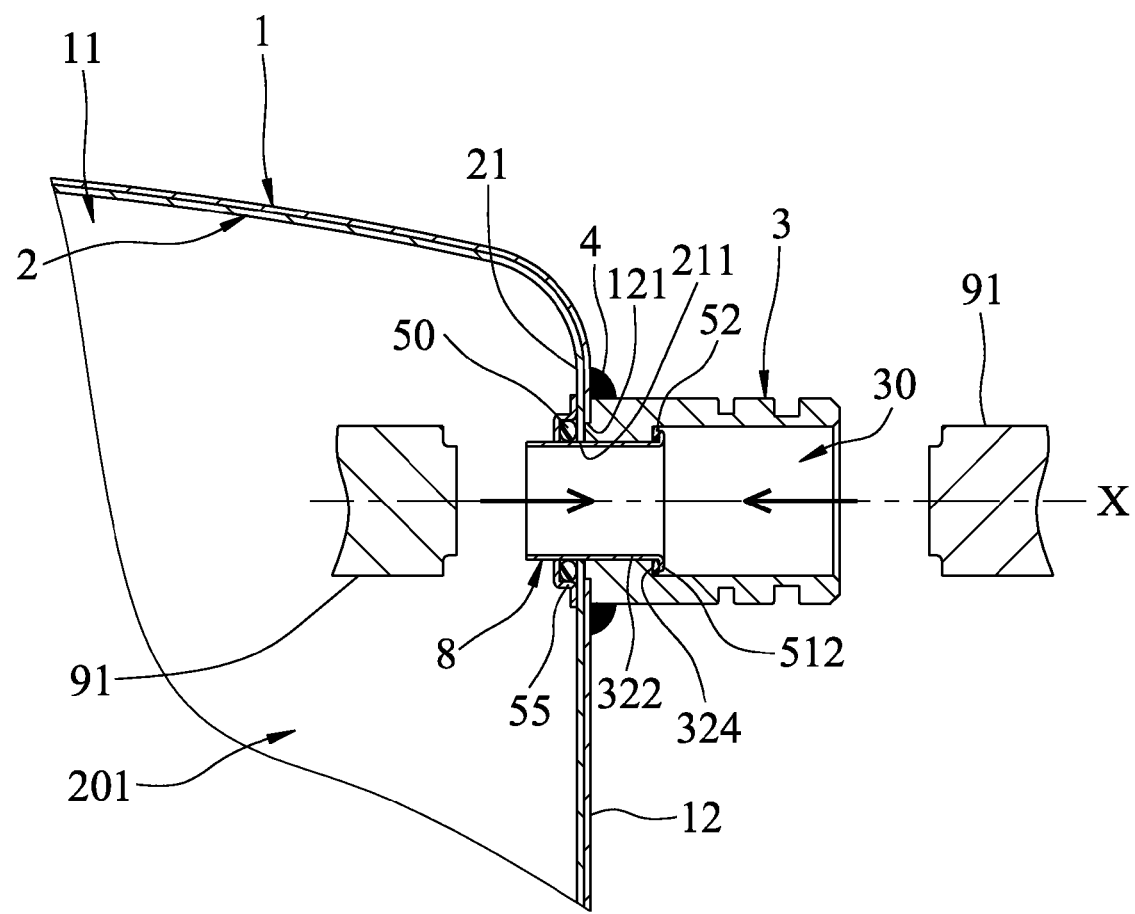

The clamping member 51 is made from a tubular metallic material 8 (see FIG. 4). The tube body 510 and the inner and outer end flanges 511, 512 are formed by deforming the tubular metallic material 8 such that the inner and outer end flanges 511, 512 are respectively bent and extend radially from the opposite ends of the tube body 510. FIGS. 3 and 4 illustrate consecutive steps of a method of assembling the pressure vessel. The method includes the steps of: welding the first tubing connector 3 to the exterior of the outer shell 1 such that the end face 321 is disposed within the side through-hole 121 and is flush with an inner surface of the outer shell 1 and that solder 4 is formed and is bonded to the first tubing connector 3 and the exterior of the outer shell 1 (see FIG. 3); inserting the inner liner 2 into the accommodating space 11 along a central axis (L) of the outer shell 1 from the bottom opening 101 of the outer shell 1 (see FIG. 3) and attaching the inner liner 2 to an inner surface of the outer shell 1; forming the liner through-hole 211 in the inner liner 2 using a cutting tool (not shown) that is extended into the diameter-reduced section 322 of the fluid channel 30 and that has a cutting edge, which is spaced apart from the axis (X) by a distance substantially the same as the radius of the diameter-reduced section 322, for cutting the inner liner 2; mounting the outer sealing ring 52 on the tubular metallic material 8 (see FIG. 4); inserting the tubular metallic material 8 through the side through-hole 121 and the liner through-hole 211 and into the inner space 201 and the fluid channel 30 (see FIG. 4); mounting the retainer plate 55 and the inner sealing ring 50 on the tubular metallic material 8 (see FIG. 4); deforming the two opposite ends of the tubular metallic material 8 using two pressing dies 91 (see FIG. 4), so as to form the tube body 510 and the inner and outer end flanges 511, 512 that are bent from the tube body 510 to press the inner and outer sealing rings 50, 52 against the inner liner 2 and the inner shoulder 324, respectively; mounting the diaphragm 6 in the accommodating space 11 and fixing the diaphragm 6 to the inner liner 2 through the annular fastening member 7 (see FIG. 1); and welding the upper end wall 141 of the base 14 to the surrounding wall 12 of the outer shell 1 (not shown). It is noted that formation of the liner through-hole 211 in the inner liner 2 after the insertion of the inner liner 2 into the outer shell 1 is advantageous in that alignment of an axis of the liner through-hole 211 with an axis of the fluid channel 30 during the insertion of the inner liner 2 into the outer shell 1 can be dispensed with.

With the inclusion of the clamping member 51 in the pressure vessel of the present invention, the aforesaid drawback associated with the prior art can be alleviated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A pressure vessel comprising:
   an outer shell defining an accommodating space therein, and having a top wall and a surrounding wall that extends downwardly from said top wall and that is formed with a side through-hole;
   an inner liner disposed in said accommodating space, and having an inner surface that defines an inner space,
   a top wall that is attached to said top wall of said outer shell, and
   a surrounding wall that extends downwardly from said top wall of said inner liner, that is attached to said surrounding wall of said outer shell, and that is formed with a liner through-hole which is aligned with said side through-hole along an axis through the center of said side through-hole;
   a tubing connector disposed outwardly of said inner space, welded to an exterior of said outer shell, and defining a fluid channel that extends along the axis;
   an anti-leakage unit having a clamping member and elastic inner and outer sealing rings, said clamping member having a tube body and inner and outer end flanges, said tube body extending along the axis through said side through-hole and said liner through-hole and into said inner space and said fluid channel, said inner and outer end flanges extending outwardly and respectively from two opposite ends of said tube body, said inner end flange and said inner sealing ring being disposed in said inner space, said outer end flange and said outer sealing ring being disposed outwardly of said inner space, said inner and outer end flanges cooperatively providing a clamping force to press said inner and outer sealing rings against said inner liner and said tubing connector, respectively; and a flexible diaphragm disposed in said accommodating space to partition said accommodating space into two separated spaces.

2. The pressure vessel of claim 1, wherein said tubing connector is disposed outwardly of said accommodating space, and has an end face that is disposed in said side through-hole and that abuts against the outer periphery of said liner through-hole, said inner sealing ring abutting against the inner periphery of said liner through-hole.

3. The pressure vessel of claim 2, wherein said tubing connector is formed with an inner shoulder, said outer end flange being disposed in said fluid channel, said outer sealing ring being sandwiched between and abutting against said outer end flange and said inner shoulder.

4. The pressure vessel of claim 3, wherein said fluid channel has a diameter-reduced section that extends between said inner shoulder and said end face of said tubing connector and that has an inner diameter, said liner through-hole having an inner diameter that is substantially equal to said inner diameter of said diameter-reduced section of said fluid channel.

5. The pressure vessel of claim 4, wherein said anti-leakage unit further has a retainer plate that is formed with a central opening, that abuts against said inner surface of said inner liner, and that cooperates with the periphery of said liner through-hole to define an annular retaining gap therebetween, said inner sealing ring being retained in said retaining gap, said tube body extending through said central opening, said inner end flange abutting against said retainer plate.

6. The pressure vessel of claim 1, wherein said clamping member is made from a tubular metallic material, said tube body and said inner and outer end flanges being formed by deforming said tubular metallic material such that said inner and outer end flanges are respectively bent and extend radially from said opposite ends of said tube body.

\* \* \* \* \*